United States Patent Office 2,940,550
Patented June 14, 1960

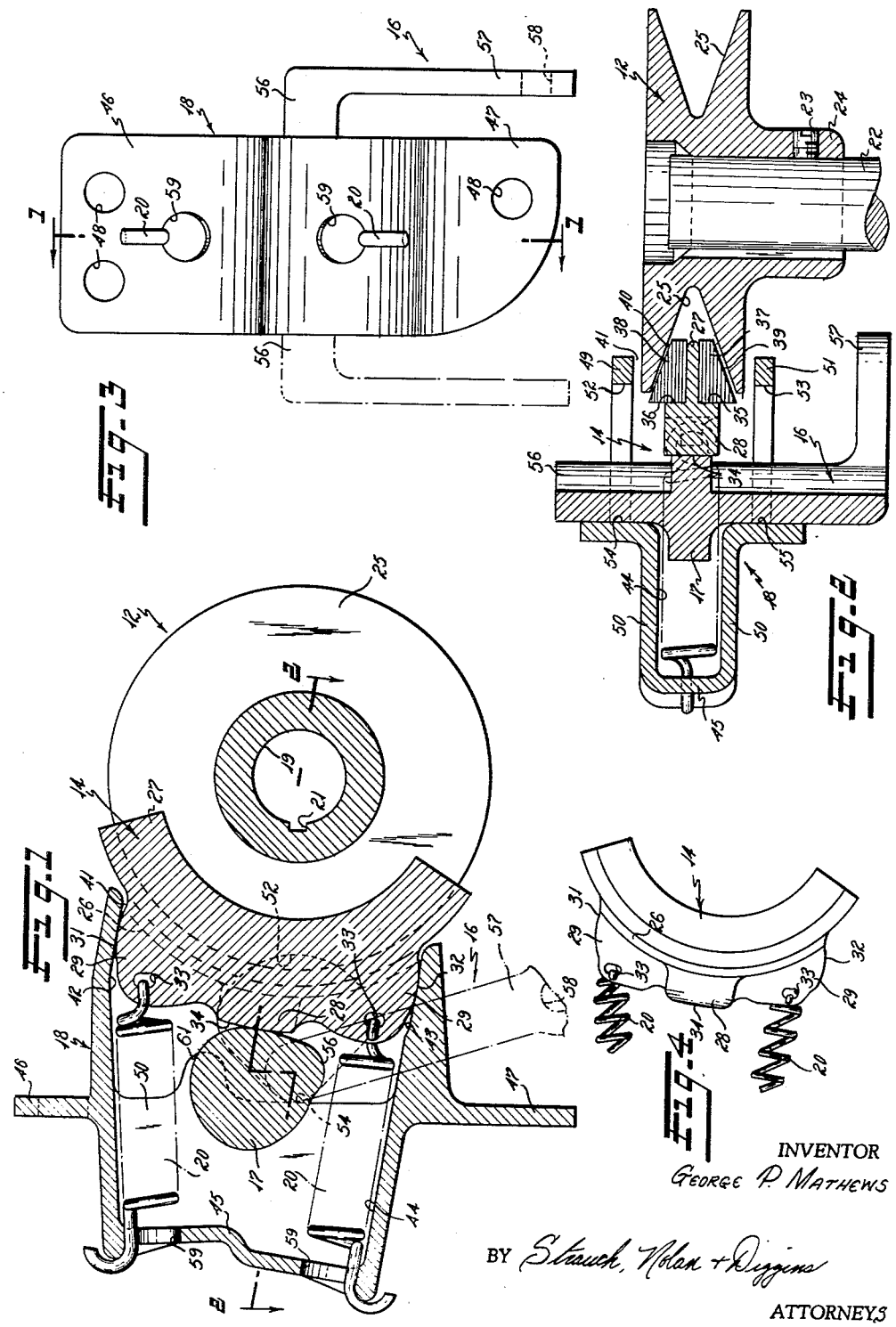

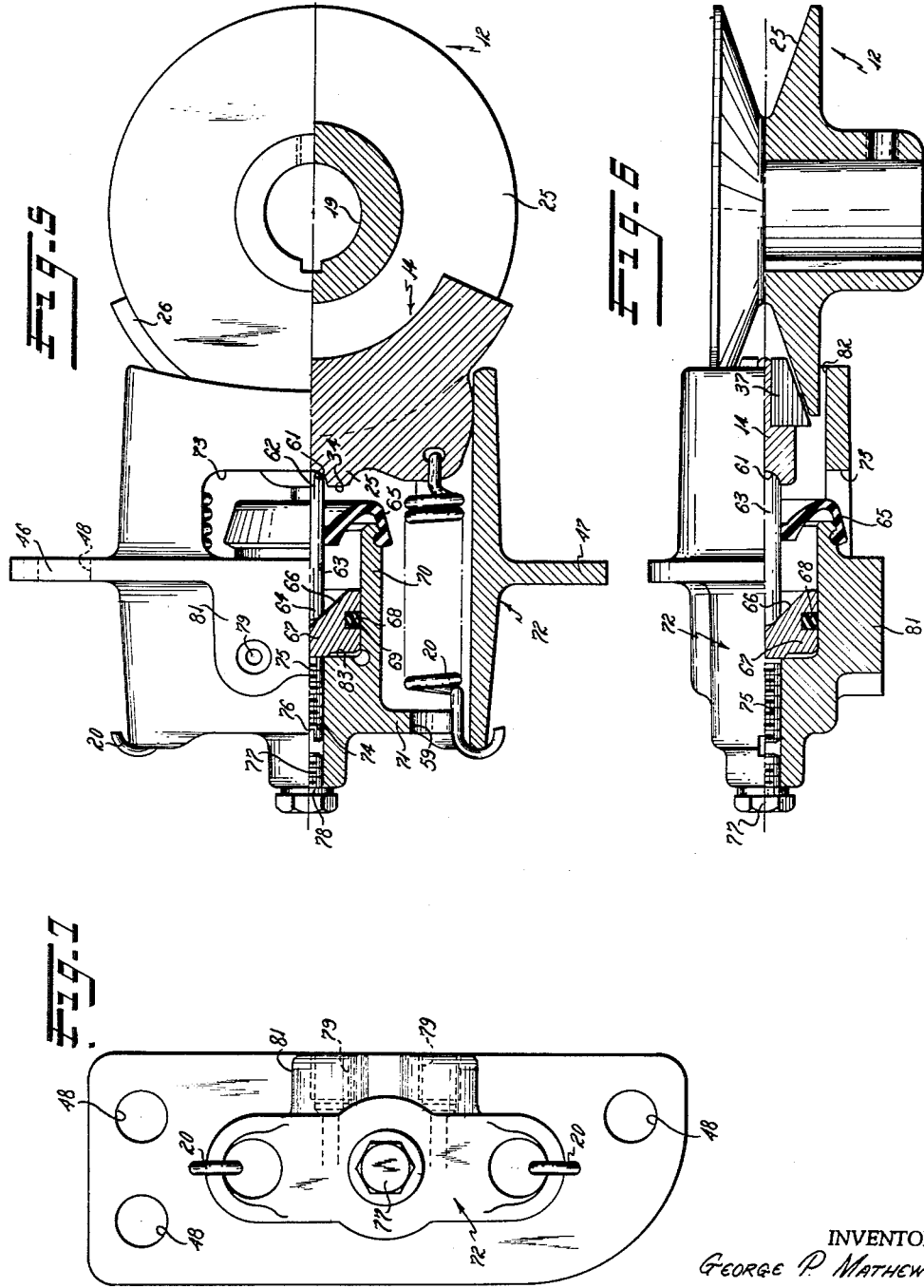
June 14, 1960  G. P. MATHEWS  2,940,550
CONE BRAKE ASSEMBLY
Filed Feb. 28, 1955  3 Sheets-Sheet 2
INVENTOR
GEORGE P. MATHEWS
BY Strauch, Nolan + Diggins
ATTORNEYS

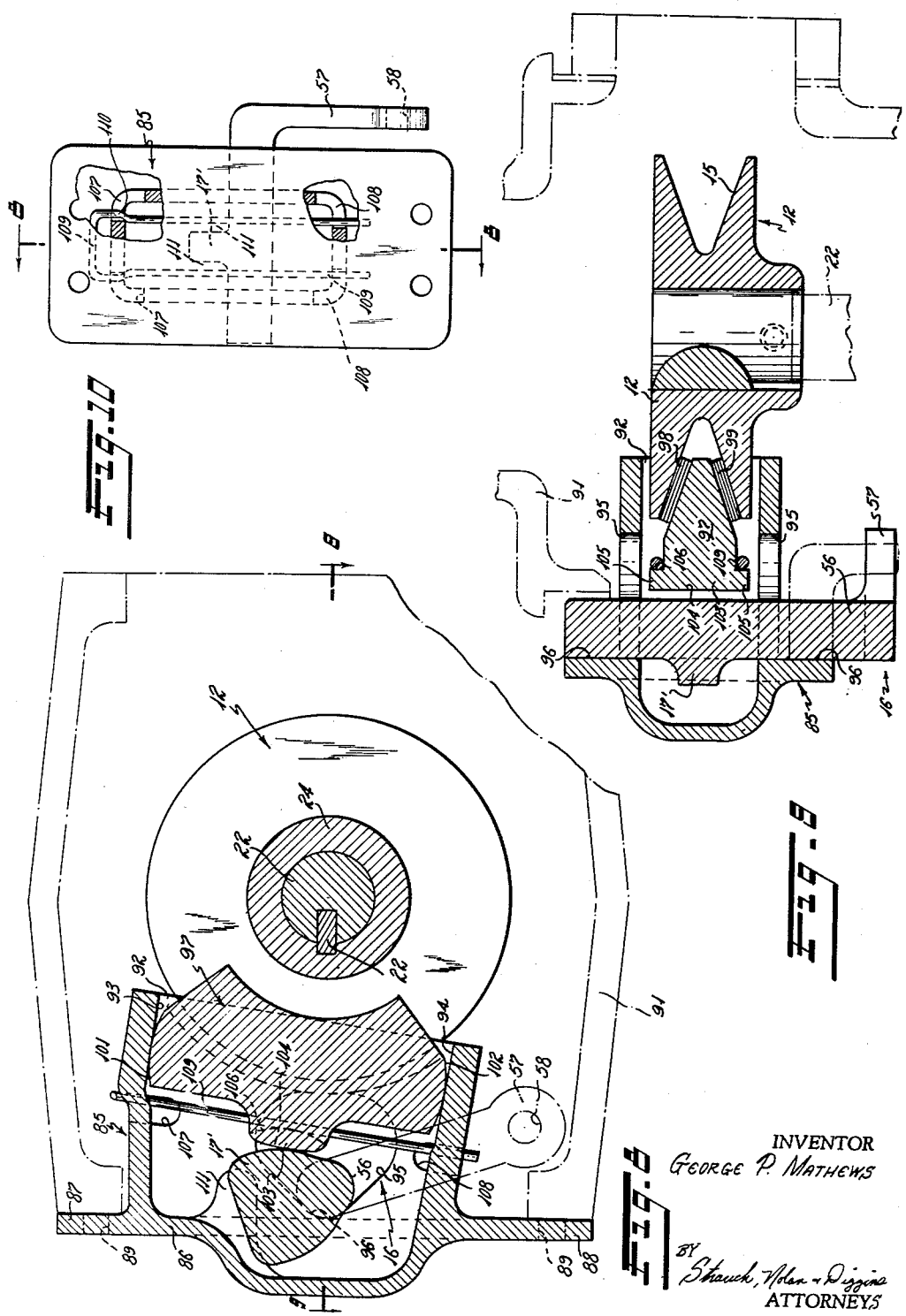

2,940,550

CONE BRAKE ASSEMBLY

George P. Mathews, Ashtabula, Ohio, assignor to Rockwell-Standard Corporation, a corporation of Pennsylvania Filed Feb. 28, 1955, Ser. No. 490,880

14 Claims. (Cl. 188—74)

This invention relates to vehicle and machinery brakes and has particular reference to an external shoe type cone brake assembly of high torque capacity.

In the past most braking equipment available to manufacturers of agricultural machines and industrial equipment have been automotive-type brakes which have proven to have insufficient capacity for many requirements and have in many instances failed to meet the spacial restrictions imposed by the winch, construction, mining, material handling and agricultural machinery fields. The invention provides a compact high capacity brake assembly meeting these requirements.

The primary object of this invention is to provide an improved small external shoe type cone brake assembly of high braking capacity which meets the spacial restrictions imposed in the winch, construction, mining, material handling, agricultural machinery and like fields.

Another object of the invention is to provide in such an assembly one or more external floating shoes equally effective for opposite directions of drum rotation.

A further object is a novel cone type brake assembly wherein a radially movable shoe floats circumferentially between end abutments.

Another object of the invention is to provide a novel brake support which locates and aligns the brake shoe, the shoe actuating means and the shoe return springs in compact assembly.

A further object of the invention is to provide a novel brake shoe abutment arrangement which guide and align the brake shoe with respect to the drum during all conditions of lining wear.

It is a further object of the invention to provide a novel cone type brake assembly wherein a brake shoe floats circumferentially between abutments on the interior of a hollow support and is adapted to be radially moved into engagement with a drum having its periphery extending into the open end of said support.

A further object of the invention is to provide a novel cone type brake assembly wherein a radially displaceable brake shoe is mounted on a support to be actuated by a cam mounted for rotation about an axis perpendicular to the direction of displacement of the shoe, and return spring means holds the shoe and cam in operative assembly on the support.

A further object of the invention is to provide a novel cone type brake assembly wherein a support slidably mounts a brake shoe and houses balanced return spring means disposed on opposite sides of an actuating cam journaled on an axis perpendicular to the direction of normal displacement of the shoe.

Further objects of the invention will become apparent as the invention proceeds in connection with the appended claims and the annexed drawings wherein:

Figure 1 is an end view in section on line 1—1 of Figure 3 showing an external shoe type cam actuated cone brake assembly;

Figure 2 is a section of the brake assembly taken substantially along line 2—2 of Figure 1;

Figure 3 is a side view of the brake assembly of Figure 1;

Figure 4 is a side elevation of the brake shoe of Figures 1-3;

Figure 5 is an end view partially broken away and sectioned of an external shoe type hydraulically actuated cone brake assembly according to an embodiment of the invention;

Figure 6 is a partially sectioned and broken away top view of the brake assembly of Figure 5;

Figure 7 is a side view of the brake of Figure 5;

Figure 8 is a partially diagrammatic and sectioned end view of an external shoe type cam actuated cone brake assembly according to another embodiment;

Figure 9 is a section along line 9—9 of Figure 8;

Figure 10 is a side view of the brake assembly of Figure 8.

Referring now to Figures 1-4 the brake assembly of the first embodiment includes a grooved brake drum 12, an external brake shoe 14, a cam actuator unit 16, a brake shoe and cam actuator housing 18 and brake shoe return springs 20 which maintain brake shoe 14 and cam 17 in abutment at all times.

Brake drum 12 has a central opening 19 and keyway 21 for non-rotatably mounting the drum on a rotatable shaft 22. A set screw 23 in drum hub 24 locks the drum on the shaft. A continuous groove 25 extends about the entire periphery of drum 14 to provide a V-shaped braking surface in cross-section as shown in Figure 2.

Brake shoe 14 preferably comprises an integral arcuate member for supporting friction lining blocks adapted to engage the sides of groove 25 in operation. It has an arcuate platform 26 from the middle of which a thin web 27 projects radially of drum 12 and centered with groove 25 in the assembly. As shown in Figure 4 the shoe has a thickened boss 28 at its middle portion that merges into platform 26 and is flanked by thinner side wings 29 that are centered transversely of platform 26. Wings 29 have similar convex oppositely facing edge surfaces 31 and 32 that are equidistant from boss 28 so that the shoe is capable of reversible mounting and the wings are formed with openings 33 for a purpose to appear. Boss 28 is formed with a convex cam engaging rear edge surface 34.

Referring to Figure 2, web 27 forms with platform 26 two right angle corner shoulders 35 and 36 for seating continuous friction lining blocks 37 and 38 that may be cemented or otherwise fixed to shoe 14. Blocks 37 and 38 may be of any hard long wearing suitable friction material such as that used in vehicle brake linings. The outer sides of the lining blocks provide inclined surfaces 39 and 40 adapted to engage the inclined side surfaces of groove 25 in operation, the angles of inclination of the surfaces being suited to each other for optimum surface area engagement and speedy release.

The hollow housing 18 is open at its forward end at 41 and formed with spaced generally parallel flat surfaces 42 and 43 that guide shoe 14 for substantially radial movement toward and from drum 12, and inwardly of these surfaces the housing provides a converging throat 44 that terminates in an integral rear wall 45. End flanges 46 and 47 are formed with openings 48 for attachment of the housing 18 to a rigid support structure, these flanges being integral with the housing and located about midway of the ends of throat 44.

The opposite side walls 49 and 51 of housing 18 forwardly of flanges 46 and 47 are formed with like openings 52 and 53 that have parallel aligned arcuate rear bearing socket surfaces 54 and 55. Rearwardly of flanges 46 and 47, as shown in Figure 2, the throat 44 is much narrower, with more closely spaced parallel side walls 50. The purpose of openings 52 and 53 is to admit and support the actuator cam unit 16 wherein eccentric cam 17 is integral with a cylindrical shaft 56 projecting from opposite sides thereof and a radial lever 57 having an opening 58 for attachment to an operator linkage (not shown). In the assembly, shaft 56 on opposite sides of cam 17 is held in bearing engagement with housing surfaces 54 and 55, and cam 17 is held in engagement with surface 34 of brake shoe 14 by tension springs 20 anchored at opposite ends in brake shoe wing openings 33 and housing rear wall openings 59 above and below the cam.

Internally of housing 18 at the inner end of the narrow part of throat 44, and above and at both sides of cam 17, are provided extensions 61 of walls 50 which as indicated in Figure 1 are disposed on opposite sides of the cam close to the cam and may serve as cam side guides, one only being shown in Figure 1. Openings 52 and 53 are large enough to permit passage of cam 17 through either during assembly, and the unit 16 may be assembled with lever 57 at either side to suit space limitations of the assembly. When the unit 16 is being assembled into the housing it is turned to permit cam 17 to pass through the opening 52 or 53 and then rotated to the Figure 1 position to position the cam 17 partially between the narrow throat side walls to limit axial travel of the unit 16 with respect to the housing.

The circumferential length of brake shoe 14 may be as great as an arc of 180° but I have found that a shoe arc length of about 130° is best for optimum performance and lining wear.

In the assembly the periphery of drum 12 projects with at least running clearance into the open side 41 of housing 18, and shoe 14 need move only a small distance to full surface engagement with the drum groove 25. In operation it will be appreciated that the shoe 14 is full floating and will abut with considerable pressure upon surface 42 or 43 depending on the direction of drum rotation, but the circumferential float is small and shoe 14 is essentially guided by surfaces 42 and 43 for translation radially of drum 12. This floating action and the coaction of the convex end surfaces of the shoe with guided surfaces 42 and 43 provides a self-centering operation that insures full shoe lining contact with groove 25.

The shoe 14 is symmetrical so that it may be assembled without regard to orientation. The balanced pull of similar springs 20 acting equidistantly from the center line through shoe 14 and surface 34 maintains the parts in fully operative condition without the necessity for special brackets and fastening means or journals, and the entire brake is easily assembled or disassembled for repair, cleaning or inspection.

If desired the friction brake lining material could be mounted in groove 25 instead of on the shoe 14, with the latter having a wedge shaped surface, lined or bare metal, for coaction therewith. Also, for some installations, it would be possible to omit blocks 37 and 38 and have bare metal to metal surface contact.

When lever 57 is rocked clockwise in Figure 1 the cam 17 causes displacement of shoe 14 into frictional engagement with drum 12, and when the pull on lever 57 is released the return springs 20 pull the shoe 14 out of engagement with the drum, at the same time rotating cam 17 counterclockwise to its Figure 1 position.

Referring now to Figures 5, 6 and 7 my improved external shoe cone type brake is illustrated as adapted for hydraulic actuation. Parts common with the embodiment illustrated in Figures 1-4 are indicated by the same reference numerals.

Shoe 14 is exactly the same as in Figures 1-4 but is formed with a spherically curved depression 61 in surface 34 of boss 28 to pivotally receive the rounded end 62 of actuating rod 63. Rod 63 extends through a conventional type hydraulic cylinder flexible seal 65 and is pivotally received at its other rounded end 64 in the convex recess 66 of a hydraulic cylinder piston 67. Piston 67 is equipped with a fluid seal O ring 68 in a groove 69 and is reciprocally mounted in a cylinder 70 which is an integral inward projection on the rear wall 71 of housing 72. Cylinder 70 is concentrically aligned with a center line through the center of brake drum 12 and the midpoint of brake shoe 14 in order that hydraulic cylinder actuation will through rod 63 bear directly on the brake shoe midpoint. An opening 73 in housing 72 is provided for inspection and maintenance of the cylinder assembly.

Hydraulic cylinder 70 extends radially inward within housing 72 midway between the return springs 20 and springs 20 maintain shoe 14, actuating rod 63 and piston 67 in tight abutment at all times. A threaded opening 74 extends through the rear wall of housing 72 concentric with cylinder 70 and a screw 75 adjustable in opening 74 abuts the rear end of retracted piston 67. The screw 75 is slotted at 76 and adjustable thereby to locate its inner end as a piston stop and thereby provides a brake shoe adjustment for taking up clearance and for proper shoe and drum running clearance. Capscrew 77 which is removable for access to adjust screw 75 and gasket washer 78 seal opening 74 from loss of brake fluid leaking around the adjusting screw. Two hydraulic cylinder conduit attachment openings 79 are provided in a housing boss 81 for fluid inlet from the master cylinder line and bleeder connections.

As illustrated in Figure 6, the periphery of brake drum 12 projects into the open side of housing 72 at 82 with at least running clearance. When brake fluid is forced under pressure through an opening 79 into the space 83 behind the piston 67, the piston is displaced to the right in Figure 5 until shoe 14 engages drum 12. When the brake fluid pressure is released, return springs 20 pull the shoe out of engagement with the drum, and the position of screw 75 determines the initial brake shoe to drum clearance.

Referring now to Figures 8, 9 and 10 another embodiment of my improved brake is illustrated. This embodiment uses substantially the same cam actuating means as in the embodiment of Figures 1-4 but has a modified shoe, different shoe return spring means and a shortened shoe and cam mounting housing.

Hollow housing 85 has a rear wall 86 aligned with upper and lower flanges 87 and 88 provided with bolt holes 89 for attachment to a rigid support structure 91 in which shaft 22 is preferably journaled. Housing 85 has an open side at 92 to receive with running clearance the periphery of drum 12, and interiorly is formed with parallel brake shoe abutment and guide surfaces 93 and 94. The side walls of housing 85 have similar aligned openings 95 providing arcuate bearing surfaces 96 for the cam shaft 56.

The brake shoe 97 is arcuate and has opposite sides inclined at the same angle as the sides of groove 25 and surfaced with friction lining material strips 98 and 99 so as to provide a V-wedge coacting with the V-groove 25 in braking, as in the other embodiments. Shoe 97 is formed with similar convexly curved end edge surfaces 101 and 102 coacting with abutment surfaces 93 and 94 respectively, and a rear abutment 103 having a convexly curved cam contact surface 104.

As shown in Figure 9, abutment 103 is formed with side projections 105 having convex surfaces 106 on their undersides. At opposite upper and lower corners, housing 85 is provided with openings 107 and 108. A U-shaped wire spring 109 is inserted through openings 107 to underlie shoe abutment surfaces 106 and its free ends project through openings 108. Spring 109 serves as a spring beam to urge shoe 97 toward retracted position in the assembly. The inwardly bent shoulders 110 (Figure 10) of spring 109 coact with the housing edges at openings 107 to prevent accidental displacement of spring 109 from the housing.

Cam 17' which is of somewhat different shape than cam 17, but functions similarly, has its edge face in bearing contact with abutment surface 104, and in the assembly stressed beam spring 109 urges abutment surface 104 against cam face 17' and in turn maintains shaft 56 against surfaces 96 as in the earlier embodiment.

Internally of housing 85 parallel projections 111 (one only shown in Figure 8) extend closely on opposite sides of cam 17' in the assembly to prevent axial displacement of the unit 16 in the assembly. The openings 95 are large enough to permit the cam 17' to pass through either during assembly of the actuator unit 16 into the housing. The operation is essentially the same as in the Figure 1–4 embodiment, shoe 97 being symmetrical and reversible and having full floating action during operation.

The invention provides new external shoe cone type brakes of high brake torque capacity in small brakes which meet the spacial restrictions imposed by many special purpose installations. It provides floating shoes equally effective for both directions of drum rotation. It provides a brake shoe and shoe actuating means and return means in a housing which supports, locates and aligns the parts.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is to be claimed and desired to be secured by United States Letters Patent is:

1. In a brake assembly of the type wherein an external shoe is adapted to frictionally engage a rotatable drum: a support positioned radially of said drum and having spaced apart fixed brake shoe guide surfaces, the spacing being circumferential with respect to said brake drum and said surfaces being substantially parallel to a radial line through the axis of said brake drum disposed essentially midway of the spaced apart guide surfaces; a brake shoe in essentially coplanar disposition with said support and said brake drum, said brake shoe having curved end abutments and being mounted on said support with said curved end abutments spaced apart a distance slightly less than said spaced apart guide surfaces and disposed for limited rocking float of the brake shoe between said surfaces, limited float between said surfaces substantially circumferentially relative to said brake drum and for brake shoe displacement substantially along said surfaces substantially radially of said drum; the respective curved end abutments of said brake shoe, when the shoe is engaged with the drum, being forced into tight abutment with one or the other of said surfaces; actuating means mounted on said support in operative engagement with said brake shoe adapted to displace said brake shoe into engagement with said drum; and spring means on said support biasing said brake shoe and actuating means into tight engagement, said spring means normally holding said brake shoe out of engagement with said drum and resiliently permitting said brake shoe displacement, said support comprising a hollow housing open at one side to receive a portion of said drum with at least running clearance, and said housing chiefly enclosing said actuating and spring means.

2. In the brake assembly defined in claim 1, said actuating means engaging said brake shoe substantially midway between its ends and said spring means exerting a balanced return force on said brake shoe.

3. In the brake assembly defined in claim 1, said actuating means comprising a cam rockably mounted on said support engaging the brake shoe substantially midway between its ends and said spring means comprising springs substantially equidistantly disposed and secured to said brake shoe on opposite sides of said cam.

4. In the brake assembly defined in claim 1, said actuating means comprising a hydraulically displaced piston and a push rod disposed between said piston and said brake shoe.

5. In the brake assembly defined in claim 1, said spring means comprising a beam spring anchored at opposite ends on the support and connect intermediate its ends to said brake shoe substantially midway between the ends of the latter.

6. In a brake assembly adapted for coaction with a rotatable drum: a hollow housing essentially coplanar with said drum and radially disposed relative to said drum open at one side and having internal spaced apart end abutment surfaces, the spacing between said surfaces being circumferential with respect to said brake drum and said surfaces being substantially parallel to a radial line through the axis of said brake drum disposed essentially midway of the spaced apart end abutment surfaces; a brake shoe with convex end abutments spaced apart a distance slightly less than the distance between said spaced abutment surfaces mounted in said housing so said convex end abutments coact with said abutment surfaces to permit limited circumferential and rocking float of said shoe between said spaced end abutment surfaces which also serve to guide said shoe for movement radially of said brake drum axis during drum engagement and return movement, a portion of said shoe projecting through said open side of the housing; and brake shoe actuating means and balanced shoe return spring means operatively connected between said brake shoe and housing and enclosed by said housing.

7. In the brake assembly defined in claim 6, said actuating means engaging said shoe substantially midway between the ends of said shoe.

8. In the brake assembly defined in claim 7, said spring means comprising tension springs spaced on opposite sides of said actuating means and extending between said brake shoe and the rear portion of said housing.

9. In the brake assembly defined in claim 7, said spring means comprising a spring beam intermediately connected to said brake shoe substantially midway between its ends.

10. In a brake assembly of the type wherein an external shoe is adapted to frictionally engage a rotatable drum: a support; a brake shoe mounted on said support for displacement substantially radially of said drum; an actuating cam assembly; open sided bearing seat means on said support releasably mounting said cam assembly for rocking movement on said support in operative engagement with said brake shoe; return spring means engaging between said brake shoe and said support resiliently maintaining the brake shoe in said support in operative engagement against said cam assembly, resiliently maintaining said cam assembly in said open sided bearing seat means and exerting a biasing force urging said brake shoe to a deactuated braking position; and means for rocking said cam assembly for displacing said brake shoe on the support toward said drum, said displacement serving to stress said spring means for brake shoe return movement.

11. In the brake assembly defined in claim 10, means on said support disposed on opposite sides of said cam for limiting axial displacement of said cam assembly.

12. A symmetrical reversible brake shoe comprising a generally arcuate concave drum engaging portion that is wedge-shaped in cross-section and provided on the side opposite said drum engaging portion with a substantially centrally disposed actuator engaging surface and adjacent opposite ends with generally convex abutment and rocker surfaces of opposite curvature.

13. In a brake assembly of the type wherein a shoe is moved toward and away from a rotatable drum having a continuous wedge-shaped groove in its periphery, a relatively stationary support having means defining spaced oppositely facing guide surfaces, a brake shoe mounted on said support for substantially reciprocable guided movement along said surfaces, said brake shoe having a substantially concave drum engaging portion that is wedge-shaped in cross-section for engaging the drum, means providing oppositely curved convex end abutment and rocking surfaces on said brake shoe adapted for rocking sliding engagement with the respective support surfaces, and actuating means on said support for positively moving said brake shoe into engagement with said drum.

14. In the brake assembly defined in claim 13, said support comprising a hollow housing open at one side to receive a portion of the drum with at least running clearance, and said housing chiefly enclosing said actuating means.

References Cited in the file of this patent

UNITED STATES PATENTS

| | | |
|---|---|---|
| 259,006 | Guernsey | June 6, 1882 |
| 1,492,082 | Noble | Apr. 29, 1924 |
| 1,773,120 | Richter | Aug. 19, 1930 |
| 1,839,088 | Normanville | Dec. 29, 1931 |
| 1,851,737 | Stoner | Mar. 29, 1932 |
| 2,047,556 | Harvey | July 14, 1936 |
| 2,079,554 | Hedgcock | May 4, 1937 |
| 2,155,818 | Carnes | Apr. 25, 1939 |
| 2,197,292 | Brady | Apr. 16, 1940 |
| 2,214,176 | Portle | Sept. 10, 1940 |
| 2,324,979 | Hatch | July 20, 1943 |
| 2,355,827 | Stelzer | Aug. 15, 1944 |
| 2,637,976 | Meyers | May 12, 1953 |
| 2,699,078 | Knosp et al. | Jan. 11, 1955 |
| 2,857,031 | Fawick | Oct. 21, 1958 |